United States Patent
Steffen et al.

(10) Patent No.: US 9,221,326 B2
(45) Date of Patent: Dec. 29, 2015

(54) DRIVE SYSTEM FOR A LAND CRAFT

(75) Inventors: Jens Steffen, Pürgen (DE); Roland Hagenlocher, Planegg (DE); Peter Ehrhart, München (DE); Harald Tamm, Polling (DE)

(73) Assignee: L-3 COMMUNICATIONS MAGNET-MOTOR GMBH, Starnberg (DE)

( * ) Notice: Subject to any disclaimer, the term of this patent is extended or adjusted under 35 U.S.C. 154(b) by 10 days.

(21) Appl. No.: 14/006,256

(22) PCT Filed: Mar. 14, 2012

(86) PCT No.: PCT/EP2012/054467
§ 371 (c)(1),
(2), (4) Date: Nov. 1, 2013

(87) PCT Pub. No.: WO2012/126785
PCT Pub. Date: Sep. 27, 2012

(65) Prior Publication Data
US 2014/0051544 A1 Feb. 20, 2014

(30) Foreign Application Priority Data
Mar. 23, 2011 (EP) .................................... 11159382

(51) Int. Cl.
*B60W 20/00* (2006.01)
*B60K 1/02* (2006.01)
(Continued)

(52) U.S. Cl.
CPC ................. *B60K 1/02* (2013.01); *B60L 3/0061* (2013.01); *B60L 7/14* (2013.01); *B60L 11/14* (2013.01); *B60L 15/2009* (2013.01); *H02K 16/00* (2013.01); *H02K 16/02* (2013.01);
(Continued)

(58) Field of Classification Search
None
See application file for complete search history.

(56) References Cited

U.S. PATENT DOCUMENTS 5,365,153 A 11/1994 Fujita et al.
6,523,436 B2 * 2/2003 Minowa et al. ............. 74/665 B
(Continued)

FOREIGN PATENT DOCUMENTS

CN 201278487 7/2009
CN 201466928 5/2010
(Continued)

OTHER PUBLICATIONS

International Search Report in priority application PCT/EP2012/054467, dated Jul. 13, 2012, pp. 1-3.
(Continued)

*Primary Examiner* — Edwin A Young
(74) *Attorney, Agent, or Firm* — Brinks Gilson & Lione

(57) ABSTRACT

A drive system (DS) for a land craft comprises a machine system (M1, M2) for driving the land craft, the machine system comprising at least a first and a second electric machine (M1, M2) acting on a common drive shaft (S) for driving the land craft, and a control device (PE, PE1, PE2) which is adapted to control the machine system for operating in at least two rotating speed operation ranges (OR1, OR2) with different rotating speeds of the drive shaft (S). The first electric machine (MI) is controlled to operate in both rotating speed operation ranges (OR1, OR2) to provide a first drive torque, and the second electric machine (M2) is controlled to operate in only one of the rotating speed operation ranges (OR1) to provide a second drive torque in addition to the first drive torque.

32 Claims, 7 Drawing Sheets

(51) Int. Cl.
  *H02K 16/00* (2006.01)
  *H02K 16/02* (2006.01)
  *H02K 21/12* (2006.01)
  *H02P 5/46* (2006.01)
  *B60L 3/00* (2006.01)
  *B60L 7/14* (2006.01)
  *B60L 11/14* (2006.01)
  *B60L 15/20* (2006.01)

(52) U.S. Cl.
  CPC ............... *H02K 21/12* (2013.01); *H02P 5/46* (2013.01); *B60L 2200/18* (2013.01); *B60L 2200/26* (2013.01); *B60L 2210/40* (2013.01); *B60L 2220/12* (2013.01); *B60L 2220/18* (2013.01); *B60L 2240/36* (2013.01); *B60L 2240/421* (2013.01); *B60L 2240/423* (2013.01); *Y10T 477/23* (2015.01)

(56) References Cited

U.S. PATENT DOCUMENTS

| | | |
|---|---|---|
| 6,612,963 B2 | 9/2003 | Minowa et al. |
| 2006/0186750 A1 | 8/2006 | Hosoe |
| 2010/0126786 A1* | 5/2010 | Stemler et al. ............... 180/9.1 |

FOREIGN PATENT DOCUMENTS

| | | | |
|---|---|---|---|
| CN | 201466928 U | * | 5/2010 |
| JP | 6014405 | | 1/1994 |
| JP | 6062597 | | 3/1994 |
| JP | 7250403 | | 9/1995 |
| JP | 07250403 A | * | 9/1995 |
| JP | 9100835 | | 4/1997 |
| JP | 2001037190 | | 2/2001 |
| JP | 2001103718 | | 4/2001 |
| JP | 2001103718 A | * | 4/2001 |
| JP | 2001231107 | | 8/2001 |
| JP | 2001231107 A | * | 8/2001 |
| JP | 2003299296 | | 10/2003 |
| JP | 2003299296 A | * | 10/2003 |
| JP | 2006-219118 A | | 8/2006 |
| JP | 2010284034 | | 12/2010 |
| JP | 2010284035 | | 12/2010 |

OTHER PUBLICATIONS

Office Action dated Feb. 25, 2014 for European Priority Application No. EP 11 159 382.8.

Office Action dated May 6, 2015 from Chinese Counterpart Application No. 201280014350.2.

* cited by examiner

DRIVE SYSTEM FOR A LAND CRAFT

CROSS-REFERENCE TO RELATED APPLICATIONS

The present application claims the benefit under 35 U.S.C. §371 of International Patent Application No. PCT/EP/2012/054467, having an internal filing date of Mar. 14, 2012, the content of which is incorporated herein by reference in its entirety.

FIELD

The present invention is related to a drive system for a land craft having an electrical machine system for driving the land craft and a control device for controlling the machine system.

BACKGROUND

Such drive systems are employed, for example, in electrically operated vehicles or hybrid vehicles, such as automobiles, buses, trains, etc. which drive over land and are commonly referred to as land crafts or land craft vehicles. Such vehicles typically have one or more driving wheels which are driven by the drive system to move the vehicle or craft in the desired movement direction. For example, the electrical energy which is necessary for the drive is supplied by a combustion engine running an electrical generator, by a fuel cell, by an accumulator battery, or by a combination of such devices acting as an electrical source. The electrical source is connected to the electrical machine system of the vehicle for driving purposes. The electrical energy of the electrical source is generally supplied to a supply circuit including power electronics, for example in the form of an electric intermediate circuit having converter circuits on both sides, which is connected to the electrical source and to the electrical machine. The electrical machine of the vehicle is supplied by the supply circuit with electrical energy in order to drive one or more driving shafts which drive the driven wheels of the vehicle. In most applications, the drive system can also carry out electrical braking with recovery of energy so that it feeds electrical energy back into the supply circuit. This energy can be consumed by other devices which are connected to the supply circuit. For example, it can be stored in an accumulator battery or in a flywheel accumulator.

The driving of electrically operated vehicles typically requires mechanical power which must be generated from electrical power with a high spread having a hyperbolic characteristic. Such hyperbolic characteristic is typically characterized by a high maximum rotation speed of the electric drive machine and a high torque at low rotation speeds, each defining a characteristic point of the hyperbolic characteristic which are connected through a hyperbola with equal power. In mechanically driven vehicles, for example driven directly through a combustion engine, this function is taken over by the manual or automatic transmission or gear box. In driving an electrically driven vehicle, this function must be assumed by the electrical drive system, particularly by the combination of the power electronics coupled to the energy source and the electric machines. The converter circuit feeding the intermediate electrical circuit is usually not a problem and may be optimized regarding various purposes. For combustion engines, there increasingly exist permanent-magnet machine generators directly integrated to the engine which have a high degree of efficiency and are coupled to active or passive converter circuits. However, the motor unit reaches its limits with various possible fields of applications and realizations of such drive systems, particularly with respect to machine size, degree of efficiency, and electrical requirements of the power electronics regarding maximum current and voltage values.

In the recent state of the art, there exist various types of machines which may be applied in an electrical drive system as set out above. For example, a permanent-magnet (PM) machine may be applied which is supplied by a converter circuit. The PM provides very high torques per weight, is capable for a direct drive, but on the other hand requires high demands for the power electronics. Since the induced voltage (so-called "EMF"_(Electromagnetic Force) or "Back-EMF") is proportional to the rotating speed, very high voltages occur with maximum speed, on the other hand high driving torques at low speed require high currents. The power electronics must be capable to accept the high voltages at high speeds and to provide high currents for high torques, which makes the power electronics very power demanding and expensive. The so-called electrical corner power (maximum voltage multiplied by maximum current) is identical with the mechanical corner power (maximum rotation speed multiplied by maximum torque).

Such high corner powers make the power electronics very power demanding and expensive since they have to provide high voltages as well as high currents to the machine. On the other hand, since maximum voltage and maximum current are never demanded by the machine at the same time, the power electronics provides an over-installation metered by the corner power as opposed to the nominal power (hyperbolic power) of the drive unit. Low requirements for the power electronics correspond to corner power which equals nominal power, high requirements for the power electronics correspond to corner power which equals maximum torque multiplied by maximum speed. In typical applications, these extremes may differ from each other by factors of between 4 and 10.

Regarding the permanent-magnet machine, the high requirements of the power electronics are often reduced by increasing the winding number of the machine, however leading to increasing induced voltages of the machine. For example, within 700 V DC systems, the machine maybe typically configured up to 1500 V induced voltage. From approximately half rotation speed on, these machines must be operated permanently with the correct phase shift to keep the terminal voltage below critical limits in order to be able to control operation of the machine. This may be realized through so-called field weakening operation with active power electronics and by means of additional safety circuits which make sure that the machine may still be operated when the power electronics fail in order to avoid high voltage load to the system. This additionally makes the drive system expensive and demanding.

The optimization of the PM machine regarding compactness and, at the same time, degree of efficiency at partial loads is only possible within limits, since for achieving high torques per weight of the machine correspondingly strong magnets are required which generate a constant high degree of losses also at partial load.

Other known drive systems employ an asynchronous machine coupled to a frequency converting circuit. This combination maps the hyperbolic characteristic well which results in rather low demands for the power electronics. However, asynchronous motors provide rather low torque per weight, thus are not that capable of serving as a direct drive. For this reason, asynchronous motors are in many cases combined with transmission gears which results in additional rotational losses.

Drive systems also employ a combination of reluctance machine and converter circuit, which may be applied as a direct drive. However, with high rotational speeds the power decreases more than the desired hyperbolic characteristic of equal power. Further, the compactness is rather low (PM machines can be constructed with approximately half of the dimensions), the degree of efficiency is in mid-range and there are low demands for the power electronics.

As a further type of electrical machine, a so-called IPM machine ("internal or interior permanent-magnet machine") supplied by a converter circuit is employed in drive systems as mentioned above. The IPM machine is a derivative of the PM machine having magnets which are embedded in the rotor, thus providing a magnetically slotted or toothed rotor for generating additional tension forces when rotating the motor. On the other hand, the IPM machine has a relatively complex rotor construction so that it may be realized only with a reduced number of poles as compared to the PM machine, which increases the weight of the machine. The demand for the power electronics may be decreased as compared to the PM machine for about 20-30%, which is nevertheless still high.

SUMMARY

It is therefore an object of the invention to provide an efficient drive system for a land craft which is capable to provide a drive characteristic desired for driving a land craft, but which requires only limited demands for the power electronics.

According to an aspect of the invention, there is provided a drive system for a land craft, comprising a machine system for driving the land craft, the machine system comprising at least a first and a second electric machine acting on a common drive shaft for driving the land craft, and a control device which is adapted to control the machine system for operating in at least two operation ranges wherein in a first operation range the first and second electric machines are operated to provide each a drive torque to the drive shaft, and in a second operation range only one of the electric machines is operated to provide a drive torque to the drive shaft. In the second operation range this electric machine may be operated as well, but not in a way to provide a respective drive torque in addition to the drive torque of the other machine.

In this way, it is possible to optimize one of the electric machines, particularly the electric machine which operates in both operation ranges to reach better degrees of efficiency of the machine. For example, the first electric machine is operated in both operation ranges to provide a first drive torque, e.g. which is equal to or less than a torque threshold (which is, e.g., the nominal torque of the first machine, and the second electric machine is operated in only one of the operation ranges to provide a second drive torque in addition to the first drive torque, if the torque to be provided at the drive shaft is higher than the torque threshold (i.e., in the above example, higher than the nominal torque of 15 the first machine). The first operation range in which both machines may operate may be a range with lower operation speed of the driveshaft, whereas the second operation range in which only the first machine operates may be a range with higher operation speed of the drive shaft. As long as only lower torques are demanded by the vehicle over both operation ranges, the first machine is operated to provide the demanded torque, whereas the second machine can remain switched off and thus produces only very low losses, if any. In the operation range with demanding higher torques the second machine is operated to provide a torque in addition to the torque of the first machine resulting 25 in a higher torque at the drive shaft.

The drive system may also be employed with more than two machines acting on a common drive shaft. With the concept of the invention, multiple electric machines having separate rotors may be combined when acting on a common drive shaft, wherein the machines may be individually optimized with respect to the respective operational speed at which they provide a drive torque.

According to an embodiment of the invention, the control device is adapted for operating the machine system according to a torque-speed characteristic which is hyperbolic having substantially constant power over at least an operating range of the operating speed. With employing the machine system according to the invention, the hyperbolic characteristic may be mapped by the drive system quite well without increasing the demands for the power electronics as set out in more detail below.

According to an embodiment of the invention, the first and second electric machines are each a permanent-magnet (PM) machine. One of the PM machines operates in both operation ranges and can be optimized for a lower nominal torque over the whole speed range. The other one of the PM machines operates only in one of the operation ranges when higher torques are required. The second PM machine can be optimized for this partial load operational range, and may be switched off at higher speeds, thus not causing any so-called offset losses in the machine which are caused by rotating the machine. In combination, this results in a higher degree of efficiency of the drive system. For example, the first and second electric machines are coupled with each other through a free-wheel clutch so that one of the machines stops rotating if its torque is not needed.

According to another embodiment, the first and second electric machines are of different types, i.e. work according to different electric-magnetic principles. In this way, different magnetic and electric machine working principles may be used in combination to achieve an overall improved degree of efficiency for the drive system and/or for reducing the demands for the power electronics.

For example, the machine system includes a permanent-magnet machine and a reluctance machine. Particularly, the first electric machine is a permanent-magnet machine and the second electric machine is a reluctance machine. For example, these machines may be placed on one drive shaft. For example, as long as only lower torques are demanded by the vehicle for both operation ranges, the PM machine is operated to provide the demanded torque, whereas the reluctance machine can remain switched off and thus produces only very low losses (if it rotates with the PM machine), or even no losses if it is decoupled from the PM machine.

The PM machine can be optimized regarding degree of efficiency in this lower torque range and provides only a relatively low nominal torque. In the operation range in which the drive system demands higher torques, the reluctance machine may be operated to provide a torque in addition to the torque of the PM machine resulting in a higher aggregate torque at the drive shaft. Preferably, the reluctance machine has a high inductance, i.e. has a high ratio of torque versus current (for example: PM machine 2000 Nm at 800 A, reluctance machine 2000 Nm at 200 A), to (provide a high torque with only low current, which therefore results in lower power at higher speeds. However, in this operation range at higher speeds the PM machine provides sufficient torque alone.

With the combination of a PM machine and a reluctance machine, a hyperbolic characteristic of the drive system may be provided which is adaptable depending on the dimensional proportions of the machines. If the fraction of the PM machine is higher, the characteristic moves away from the hyperbolic course and vice versa.

According to another embodiment, the machine system includes a permanent-magnet machine and an asynchronous machine, particularly wherein the first electric machine is a permanent-magnet machine and the second electric machine is an asynchronous machine.

Like the reluctance machine, the asynchronous machine does not induce an induced voltage ("EMF") into the stator as the PM machine does because there are no permanent magnets in the rotor.

Thus, by using a machine other than a PM machine as the second electric machine in the drive system, the second machine can be designed to provide a high torque at low currents when operated in an operation range with lower rotating speeds, wherein the machine nevertheless can be rotated with higher speeds without exceeding a voltage limit in an operation range with higher rotating speeds, because the voltage induced in the stator by the rotor magnetic field can be influenced and reduced at high speeds by controlling the magnetic field of the rotor appropriately. At high speeds where usually lower torques are required, the necessary torque for the drive can be efficiently provided by the PM machine, so that the second machine may rotate in idle state with the PM machine without adding a drive torque to the shaft, or may be decoupled from the PM machine during this operating range.

According to another embodiment, the machine system includes a reluctance machine and an asynchronous machine, particularly wherein the first electric machine is a reluctance machine and the second electric machine is an asynchronous machine.

For example, the first electric machine and the second electric machine are fixedly coupled with each other. Advantageously, they are coupled in a manner that their rotor systems are twisted in angle. In this way, the phasing of the stator systems may be optimized in accordance with the particular application and alternating torques of the machines maybe reduced.

According to an embodiment, the first electric machine and the second electric machine are coupled with each other through a transmission gear, so that the first and second machines rotate at different speed. In this way, a PM machine can be rotated at lower rotational speeds (inducing a lower EMF in the stator), and the second machine can be rotated at higher speeds and can be optimized regarding weight and dimensions which typically decrease with higher rotational speeds. According to another embodiment, the electric machines may each be coupled to the drive shaft through a respective transmission gear.

For example, a first rotor of the first electric machine and a second rotor of the second electric machine are coupled to, e.g. placed onto, the common shaft, wherein a common stator system for both machines is provided which is common for the first and second electric machines. In this way, a common cooling may be used for the machines and overall dimensions of the machine system may be reduced.

According to another embodiment, the first electric machine and the second electric machine are coupled with each other through a coupling or through a free-wheel clutch. Thus, when the second machine is not necessary to be operated, rotation friction losses may be reduced by decoupling or free-wheeling of the second machine from the first machine.

Preferably, the first electric machine may comprise first stator metal sheets, and the second electric machine may comprise second stator metal sheets which are greater in thickness than the first stator metal sheets. Thicker metal sheets are advantageous regarding efficiency in machines with lower rotational speeds.

According to an embodiment, the control device is coupled with an angular transmitter or rotor position sensor which is common for both electric machines.

For example, the machine system includes a permanent-magnet machine which comprises surface magnets, or is of magnetic flow concentrated construction, or has a Halbach arrangement of the magnets. A Halbach arrangement is known in the art and includes intermediate magnets having magnetic fields placed at right angles between two magnet poles of a PM machine for supporting the magnetic field of the magnet poles. A flow concentrated construction is known in the art to comprise intermediate magnets having magnetic fields placed at right angles between two poles formed from iron of a PM machine.

According to another embodiment, the first and second electric machines are housed in a common housing, or are housed in separate housings. These may be coupled to a common cooling system. For example, the cooling system is indirectly water-cooling the stator systems of the first and second electric machines.

Preferably, the first electric machine and the second electric machine are at least partially manufactured from same machine parts, for example comprise same stator metal sheets to reduce costs when manufacturing the machine as same parts can be used in manufacturing multiple machines.

For example, the first electric machine and the second electric machine are at least partially manufactured from same axial segment parts, such as same stator metal sheets, wherein the first electric machine comprises a first number of axial segment parts and the second electric machine comprises a second number of axial segment parts. Thus, the construction of the machines may be such that the machines may be composed of a variable number of axial segment parts resulting in machines of different length. Thus, the segment parts may be used to manufacture the machines in a modular way depending on the particular application. In this way, the drive system may be adapted according to the overall power requirements and the particular implementation and shape of the desired hyperbolic characteristic.

According to an embodiment, a gear device is partially integrated inside the inner free space of one of the electric machines or inside the inner free space of both electric machines. The gear may be an integral part of a respective machine.

For example, the machine system may be designed such that one of the machines, for example the first electric machine, is built in hollow shaft design and another of the machines, for example the second electric machine, is designed with smaller diameter than the one of the machines and is built in the one of the machines. In this way, a compact machine system may be provided.

Preferably, one of the machines is designed with an inner rotor and another of the machines with an outer rotor.

For example, the machine with the outer rotor is built in the machine with the inner rotor and both machines have the same rotor carrier.

According to an embodiment, the machine with the outer rotor is built in the machine with the inner rotor and both machines have the same rotor back iron. For example, the rotor back iron is made of laminated sheets.

According to an embodiment, the machine with the inner rotor is built in the machine with the outer rotor and both machines have the same stator carrier and/or have the same stator cooling.

For example, the operation ranges are at least two speed operation ranges with different speeds of the drive shaft, wherein the operation ranges are delimited by a threshold indicative of a speed.

In another example, the operation ranges are at least two torque operation ranges with different torques at the drive shaft, wherein the operation ranges are delimited by a threshold indicative of a torque.

In a further embodiment, the control device is adapted for operating the machine system according to a torque-speed relation, wherein the first operation range covers speeds of the drive shaft greater than a first threshold, and torques at the drive shaft greater than a second threshold.

In another embodiment, the control device is adapted for operating the machine system according to a torque-speed relation, wherein the operation ranges are delimited by a threshold curve between a first threshold indicative of a first torque at a first speed, and a second threshold indicative of a second torque at a second speed. For example, the threshold curve is at least in part elliptical, or hyperbolic, or straight.

BRIEF DESCRIPTION OF THE DRAWINGS

The invention will now be explained with reference to the following figures which illustrate exemplary embodiments of the present invention, wherein.

DETAILED DESCRIPTION

Figure 1A:
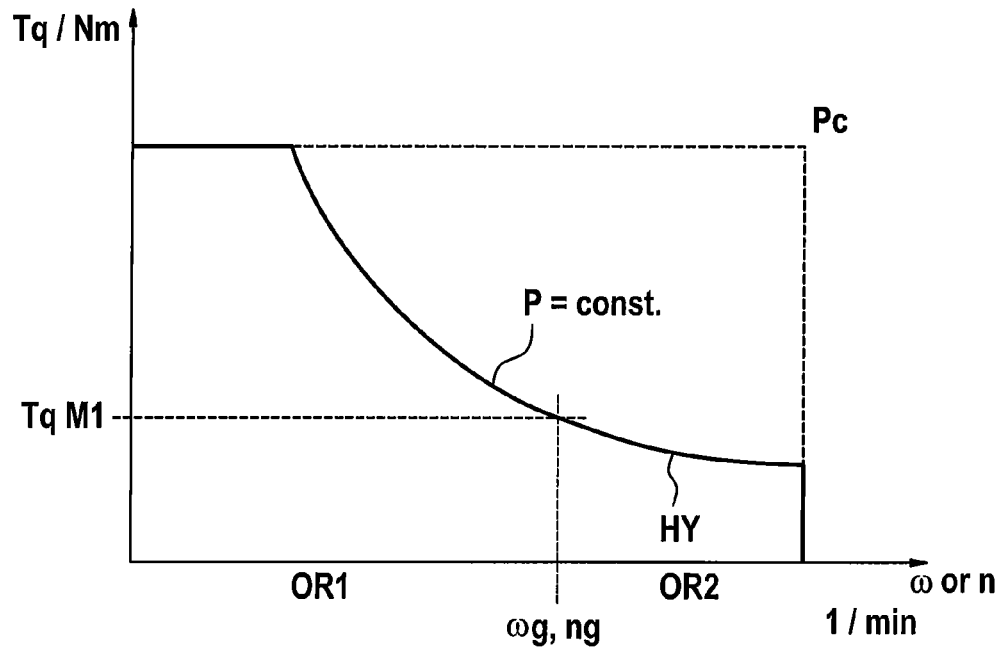
FIGS. 1A-E show an exemplary hyperbolic torque-speed characteristic according to which the drive system of the invention may be operated, and various embodiments of controlling the machine system according to various implementations of operation ranges.

Referring first to FIG. 1A, there is shown an exemplary hyperbolic torque-speed characteristic according to which the drive system of the invention may generally be operated. The characteristic depicts the relation between rotational speed n (number of revolutions) or angular speed $\omega$ ($\omega=2\pi n$) and the torque Tq acting on the drive shaft. The torque-speed characteristic HY in this example is hyperbolic and has substantially constant power over most of the operating range of the machine system. In the range of lower speeds the torque is limited to maximum torque of the machine system. FIG. 1A also shows the corner power Pc, as mentioned herein before, which is calculated from maximum torque multiplied by maximum angular speed. The characteristic of FIG. 1A will now be explained in more detail with reference to FIG. 2.

Figure 1B:
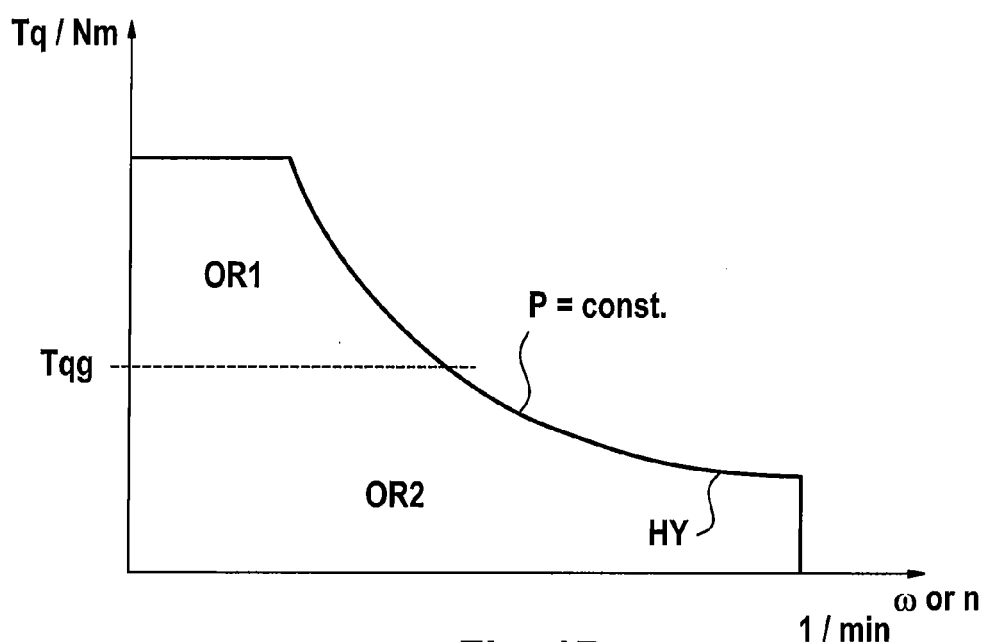
Figure 1C:
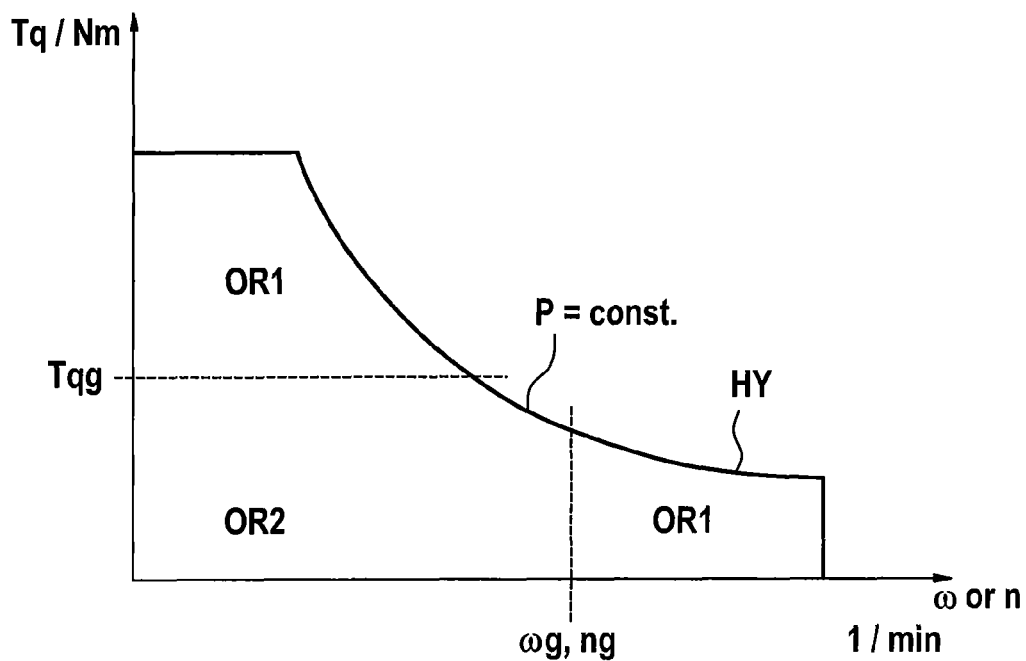
Figure 1D:
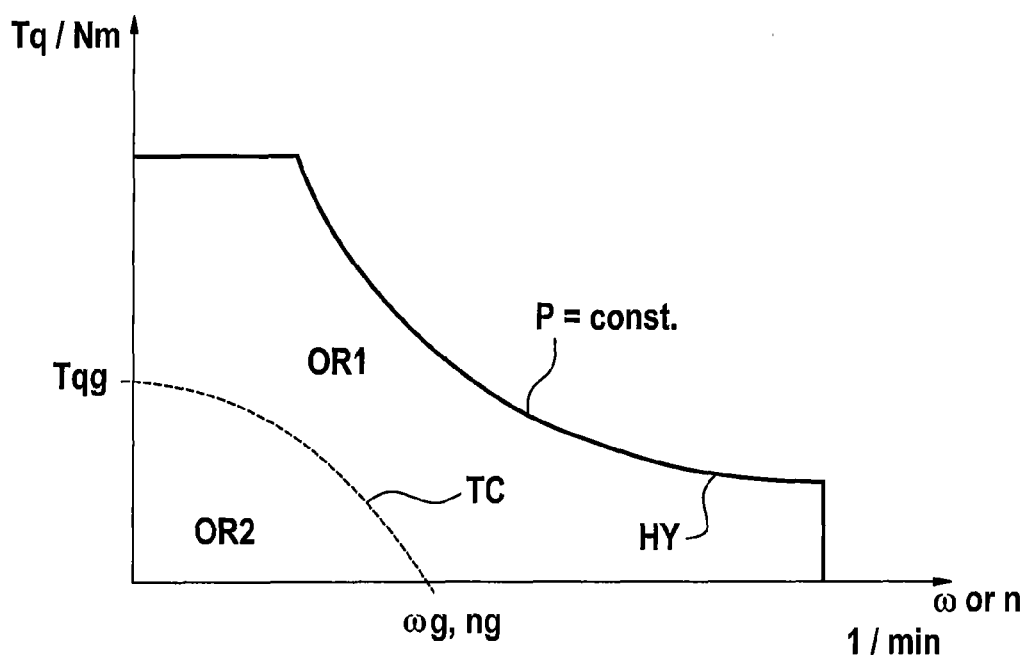
Figure 1E:
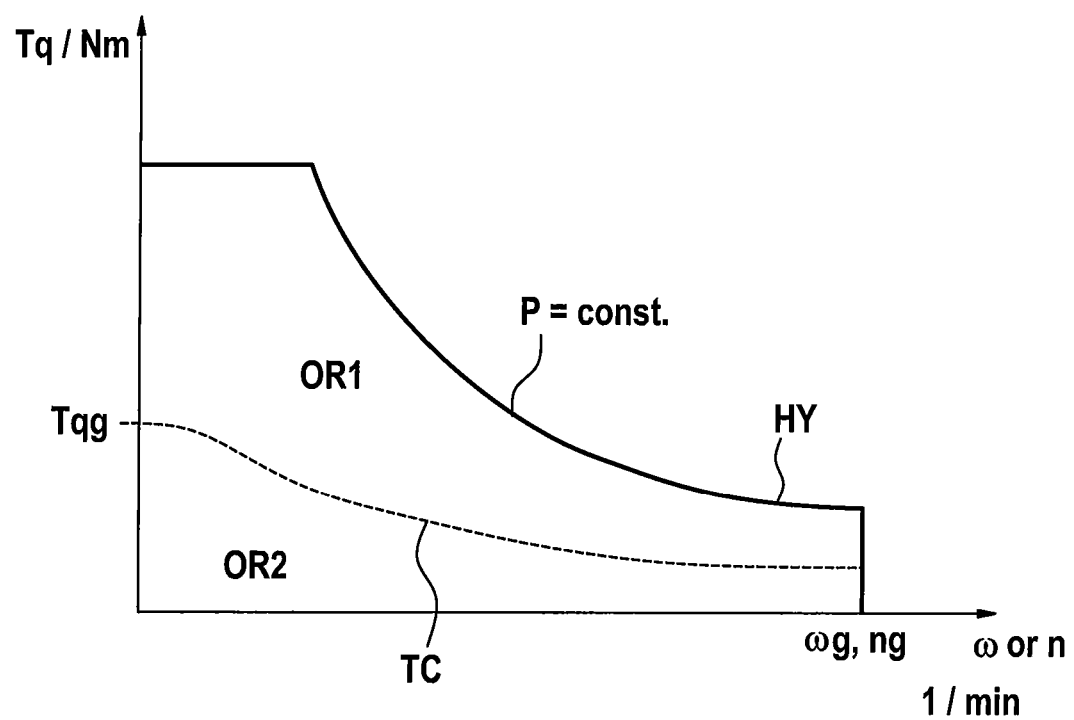
Figure 2:
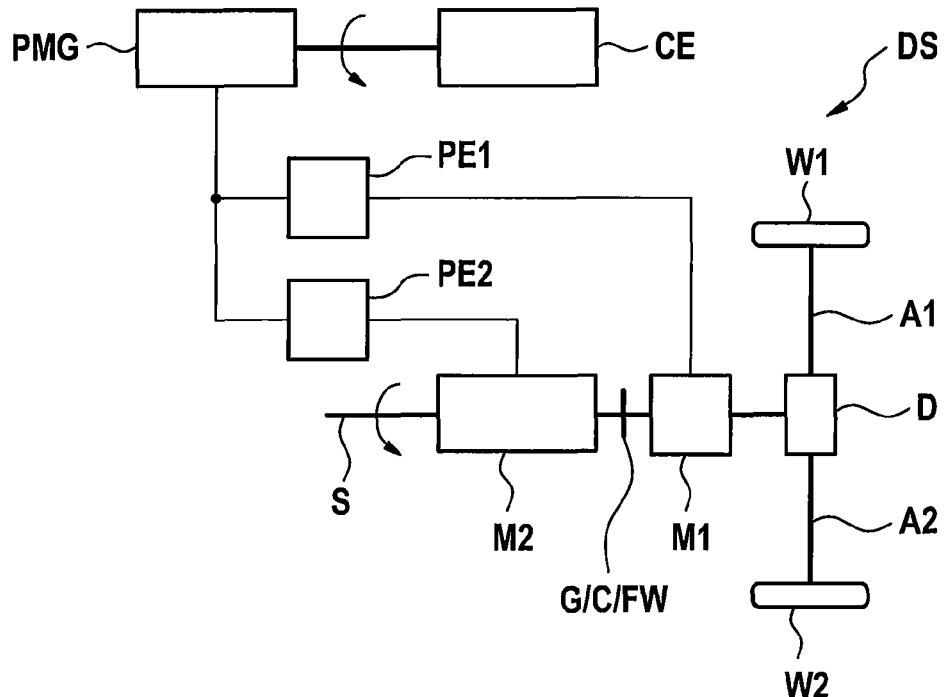
FIG. 2 shows an embodiment of a drive system of the invention.

FIG. 2 shows an exemplary embodiment of a drive system according to the invention. The drive system DS is for driving a land craft, such as an automobile, wherein only parts of it are schematically shown in FIG. 1 with wheels W1 and W2 driven by respective axles A1 and A2. A differential transmission or gear D serves for transmitting the torque from the drive shaft S with electric machines M1 and M2, which are operating as motors, to the axles A1 and A2 as commonly known.

More particularly, the drive system comprises a machine system for driving the land craft, wherein the machine system comprises a first electric machine M1 and a second electric machine M2, which both act on common drive shaft S as motors for driving the land craft. For example, the respective rotors of the machines M1, M2 are placed on the common shaft S or are otherwise coupled with it appropriately in a way that the torques of the machines are both acting on the drive shaft S for rotating it in order to drive the vehicle. In general, the drive system also comprises a control device which encompasses power electronics PE1 for driving machine M1 and power electronics PE2 for driving machine M2. The power electronics PE1, PE2 are coupled with an energy source such as a permanent-magnetic machine generator PMG which is driven by a combustion engine CE to generate electrical energy to be provided to the power electronics PE1, PE2. For example, the power electronics PE1, PE2 each comprise an intermediate DC circuit coupled between two converter circuits (not shown) as is known in the art for supplying power from the PMG to the intermediate circuit and to the electric machines M1, M2, respectively, and vice versa. Alternatively, the PMG may have its own power electronics to provide power to a single intermediate DC circuit to which the power electronics PE1, PE2 are both coupled, which in turn comprise a respective converter circuit for supplying the machines M1, M2.

The machines M1 and M2 may be coupled directly through the shaft S in that the rotors of the machines are placed adjacent to one another on the shaft, or they are coupled through a transmission gear G (so that the machines M1 and M2 may rotate at different speeds, but with a fixed transmission ratio), a coupling C, or a free-wheel FW as described above.

The power electronics PE1 and PE2 are controlled in a way that the machine system operates in at least two operation ranges OR1, OR2 which, in the example of FIG. 1A, have different rotating speeds of the driveshaft S. The operation range OR1 is a range in which the drive shaft S is operated with lower operation speed than in operation range OR2 which is a range with higher operation speed of the drive shaft S.

The electric machine M1 is controlled by power electronics PE1 to operate in both operation ranges OR1 and OR2, i.e. over the whole operation range of the drive system. The electric machine M2 is controlled to operate in only operation range OR1, i.e. in the example of FIG. 1A only in a range with lower rotational speed. In this way, it is possible to optimize the electric machine M1, which operates in both operation ranges OR1, OR2, for the lower torque range of the drive system to reach better degrees of efficiency of the machine.

Particularly, the electric machine M1 is operated in both ranges OR1, OR2 to provide a drive torque equal to or less than a torque threshold TqM1, which is, e.g., the nominal torque of the machine M1. The second electric machine M2 is operated only in operation range OR1 to provide a drive torque on the shaft S in addition to the drive torque of machine M1, if the demanded torque to be provided on the drive shaft S is higher than the nominal torque TqM1 of machine M1. As long as only torques below TqM1 are demanded by the vehicle over both operation ranges OR1, OR2, the machine M1 provides the demanded torque, whereas the machine M2 can be switched off through coupling C, for example, and thus produces no losses. In the operation range OR1 below speed $\omega g$ or ng, respectively, in case that torques higher than TqM1 are demanded the machine M2 provides a torque in addition to the torque of the machine M1 resulting in an aggregate torque at the drive shaft which is higher than TqM1. In the operation range OR2 the electric machine M2 may be in principle operated in that it is coupled to the power electronics PE2 and supplied with electric current, but it is not operated in a way that it provides a drive torque on the shaft S in addition to the drive torque of the machine M1.

For example, the machine system may be operated to follow along the torque-speed characteristic with substantially constant power P=constant. In the operating range OR2 above speed ng or ωg, the torque maybe solely supplied by machine M1 as the demanded torque is below or equal the nominal torque TqM1 of machine M1. At the speed ng or ωg and below, when the machine M1 is operated at lower speeds, the machine M1 reaches its nominal torque TqM1 and, thus, cannot provide the demanded torque alone. Therefore, if the torque to be provided on the drive shaft S is higher than the torque TqM1, the machine M2 is operated to provide an additional torque on the drive shaft to provide, in sum, the demanded torque on the shaft S for being transmitted to the wheels W1, W2.

Advantageously, the machine M2 can be designed to provide a high torque at low currents which adds to the torque TqM1 of machine M1 when operated in the operation range OR1, so that the drive system can provide the overall drive torque Tq. If the machine M2 is also operated with high speeds above ng or ωg in the operation range OR2, the power electronics PE2 may be controlled such that the voltage induced in the stator of M2 is reduced, particularly in case the machine M2 is not a PM machine. Thus, the voltage demands for power electronics PE1 and PE2 may advantageously be decreased, and no further safety circuits are necessary to keep the voltage below the limits of the power electronics. This advantageously decreases the corner power of the drive system as mentioned above.

For example, the electric machines M1, M2 are each a permanent-magnet machine. In this case, the corner power problem is not addressed, but higher degrees of efficiency may be achieved for the overall drive system, as set out above.

According to another example, the electric machine M1 is a permanent-magnet machine and the second electric machine M2 is a reluctance machine. In another embodiment, the electric machine M1 may be a permanent-magnet machine and the second electric machine M2 an asynchronous machine. In a further variant, the electric machine M1 is a reluctance machine and the electric machine M2 is an asynchronous (AC induction) machine.

For example, a gear device, such as transmission gear G, is partially integrated inside the inner free space of one of the electric machines M1 or M2.

Figure 3:
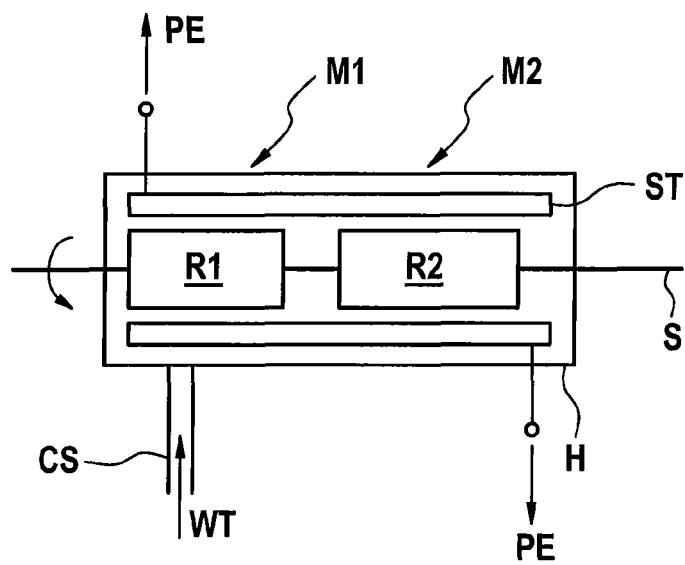
FIG. 3 shows an embodiment of a machine system wherein two rotors of two machines are enclosed within a common stator.

As shown in FIG. 3, the machine M1 comprises a rotor R1 and the machine M2 comprises a rotor R2 which are placed on the common shaft S. In this embodiment, there is provided a common stator system ST which is common for the machines M1, M2, i.e. the common stator system ST operates both rotors R1 and R2. For example, the rotors may have different length and may be of different type depending on the type of machine M1, M2. If machine M1 is a PM machine and machine M2 is a reluctance machine, then the rotor R1 is provided with permanent magnets, and rotor R2 is designed as a rotor for a reluctance machine. The electric machines M1, M2 are housed in a common housing H. An advantage thereof is that the common stator ST may be cooled by a common cooling system CS, preferably by indirectly water-cooling with water WT. A further advantage is that there is only a need for a common power electronics PE instead of separate power electronics PE1, PE2.

Figure 4:
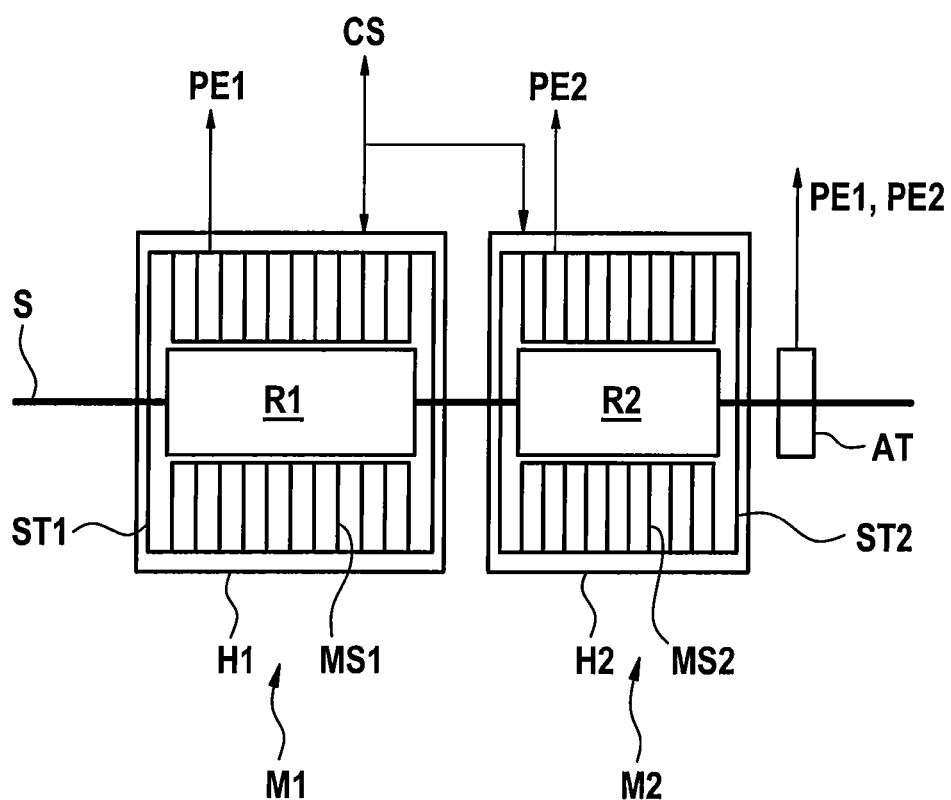
FIG. 4 shows an embodiment of two separate machines of a machine system.

FIG. 4 shows an embodiment of two separate machines of a machine system, with machine M1 comprising a rotor R1 and a stator ST1, and machine M2 comprising a rotor R2 and a stator ST2. In this way, both machines M1, M2 can be optimized individually for their respective operation ranges, which results in a best "set" of the drive system. For example, the machine M1 comprises stator metal sheets MS1, and the machine M2 comprises stator metal sheets MS2 which are greater in thickness than the stator metal sheets MS1, which is advantageous for the machine M2 operating at lower speed as compared to machine M1.

For example, as shown in FIG. 4 as well, the power electronics PE1, PE2 are coupled with an angular transmitter or rotor position sensor AT which is common for both electric machines M1, M2, i.e. provides a common angular signal to PE1, PE2 for controlling commutation of the machines M1, M2. In this embodiment, the machines M1, M2 are housed in separate housings H1, H2 which are coupled to a common cooling system CS, wherein the cooling system is indirectly water-cooling the stator systems ST1, ST2. In an embodiment where the metal sheets MS1 and MS2 are equal in thickness, the machines M1 and M2 may be manufactured with same stator metal sheets. For example, the stator ST1 of the electric machine M1 and/or the stator ST2 of the electric machine M2 is indirectly watercooled.

FIGS. 5 to 8 show exemplary embodiments of electric machines of a machine system which may be realized in various constructional ways which provide advantages in creating a compact and effective machine system.

Figure 5:
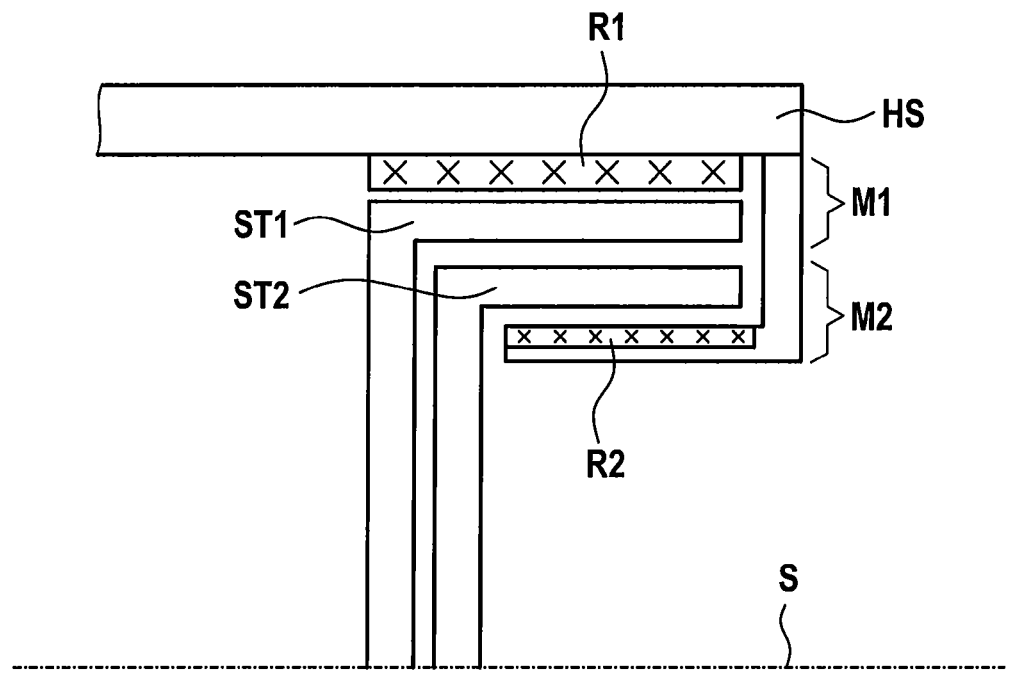
FIGS. 5-8 show exemplary embodiments of electric machines of a machine system in various constructional designs.

As shown in FIG. 5, one of the machines, such as machine M1 with rotor R1 and stator ST1, is built in hollow shaft design comprising a hollow shaft HS, wherein the rotor R1 and stator ST1 are arranged inside the hollow shaft HS. The other of the machines, in this example machine M2 with rotor R2 and stator ST2, is designed with a smaller diameter than the machine M1 and is built in the machine M1, such that the stator ST2 and rotor R2 are arranged inside the machine M1.

Figure 6:
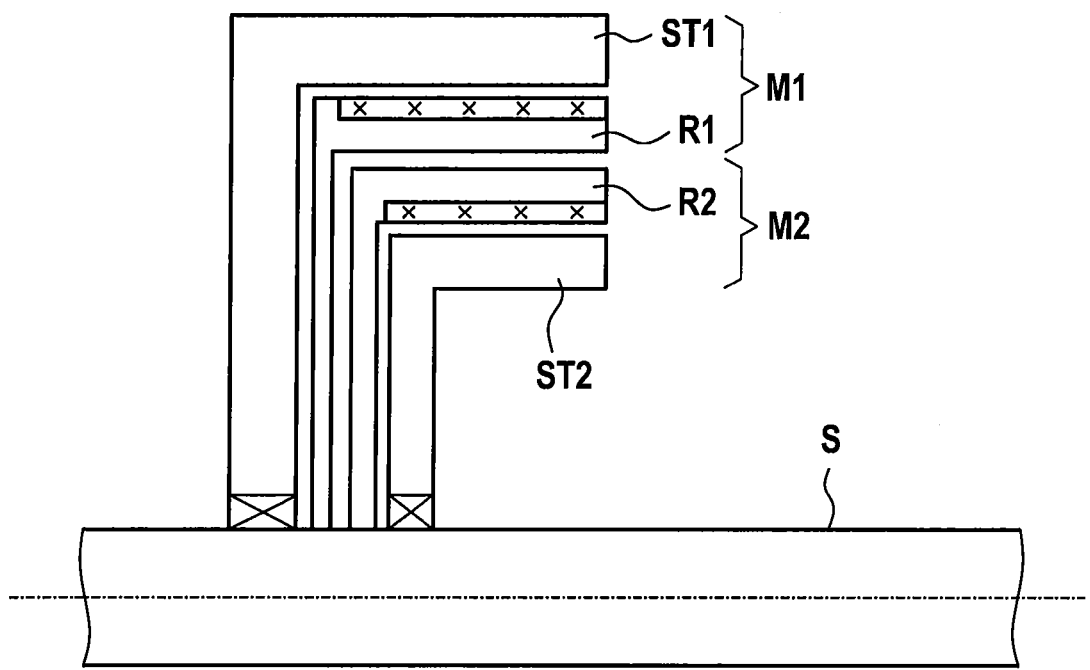

For example, as shown in FIG. 6, one of the machines (in this example machine M1) is designed with an inner rotor (rotor R1) and the other of the machines (in this example machine M2) is designed with an outer rotor (rotor R2), such that the outer rotor is arranged at the outer periphery of the stator (stator ST2) of the machine.

Figure 7:
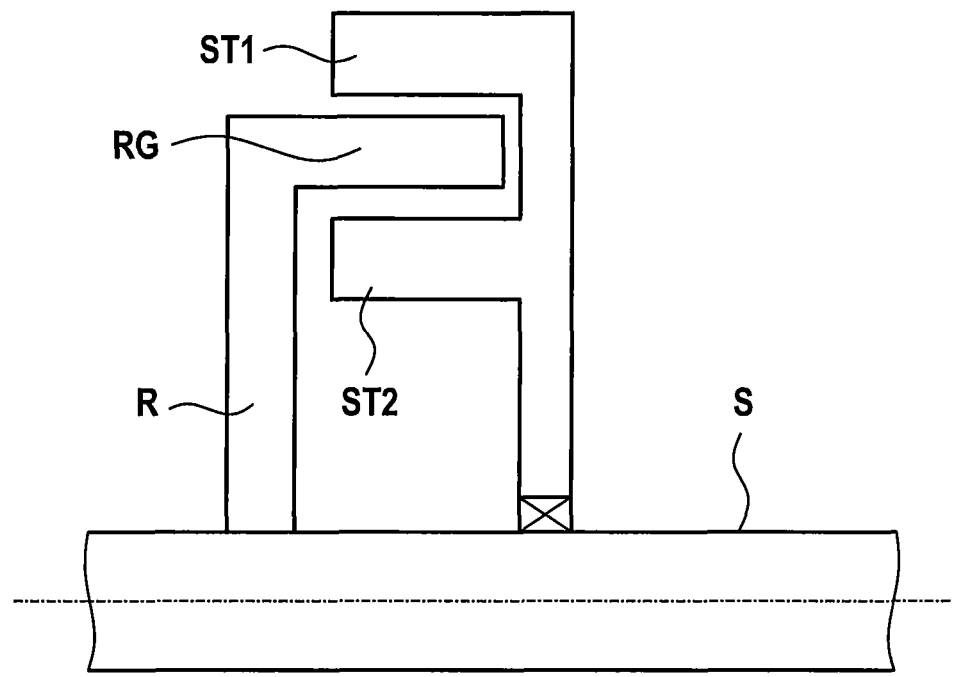

As shown in FIG. 7, the machine with the outer rotor (such as machine M2 as depicted in FIG. 6) is built in the machine with the inner rotor (machine M1) and both machines have the same rotor carrier, such as rotor carrier RG for the common rotor R as shown in FIG. 7. For example, both machines have the same rotor back iron for the magnets, which is formed in the present example by the rotor carrier RG. For example, the rotor back iron is made of laminated sheets.

Figure 8:
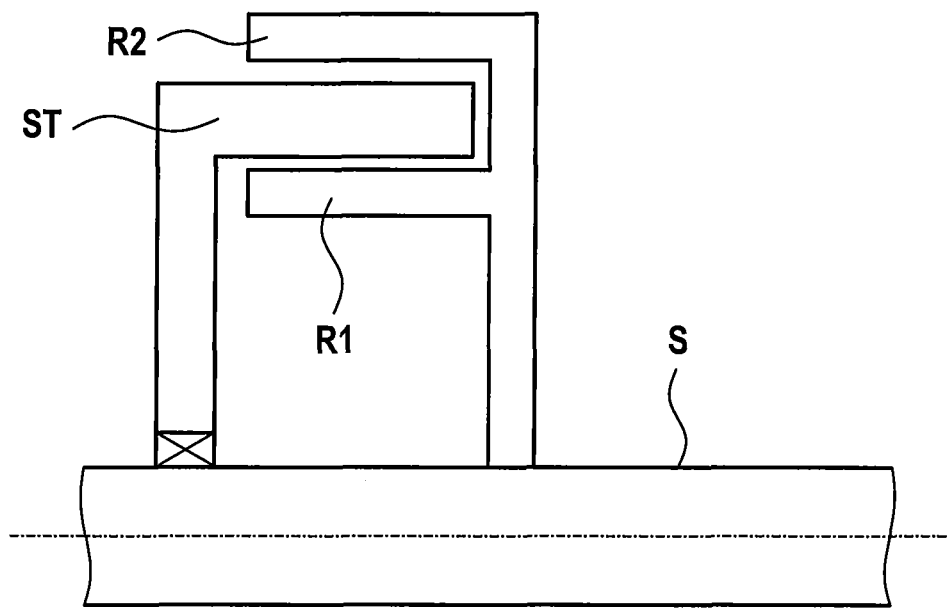

According to the embodiment of FIG. 8, one of the machines (in the present example, machine M1) with the inner rotor (rotor R1) is built in the machine (machine M2) having an outer rotor (rotor R2), wherein both machines have the same stator carrier, such as shown in FIG. 8 with stator ST common for both machines M1, M2 which is arranged on a common carrier. In this example, whether or not the machines have the same stator carrier, both machines may be constructed in a way that they have a common stator cooling.

According to FIGS. 1B-1E, further embodiments of controlling a machine system according to principles of the invention are depicted. Particularly, FIGS. 1A-1E show various embodiments of operation ranges implemented by the control device of the drive system, e.g. by the power electronics as shown in FIG. 2.

According to FIG. 1A, as described above, the operation ranges OR1, OR2 are at least two speed operation ranges with different speeds of the drive shaft, wherein the operation ranges are delimited by a particular speed, i.e. a threshold ωg or ng which is indicative of a speed. In operation range OR1, in a first example, a PM machine and a reluctance machine may be operated to provide each a respective drive torque to the drive shaft. In a second example, a first PM machine and a second PM machine may be operated to provide each a respective drive torque to the drive shaft. In operation range OR2, only the PM machine (first example) and the first PM machine (second example), respectively, is operated to provide a drive torque to the drive shaft.

According to FIG. 1B, the operation ranges OR1, OR2 are at least two torque operation ranges with different torques at the drive shaft, wherein the operation ranges are delimited by a torque threshold Tqg (i.e. are delimited by a straight threshold curve with threshold Tqg in a torque-speed relation). In operation range OR1, in a first example, a PM machine and a reluctance machine may be operated to provide each a respective drive torque to the drive shaft. In a second example, a first PM machine and a second PM machine may be operated to provide each a respective drive torque to the drive shaft. In operation range OR2, only the PM machine (first example) and the first PM machine (second example), respectively, is operated to provide a drive torque to the drive shaft.

In FIG. 1C, a further embodiment of operating the machine system is illustrated. Again, the control device operates the machine system according to a torque-speed relation, as in FIGS. 1A and 1B, for example according to the torque-speed characteristic HY as described before. In the embodiment of FIG. 1C, the operation range OR1 covers speeds of the drive shaft greater than a threshold ωg or ng which is indicative of a speed, and torques at the drive shaft which are greater than a torque threshold Tqg. In the second operating range OR2, the machine system is operated with speeds and torques below ωg or ng and Tqg wherein only one of the machines provides a drive torque to the drive shaft. For example, a first PM machine and a second PM machine may be operated to provide each a respective drive torque to the drive shaft in operation range OR1. In operation range OR2, only the first PM machine is operated to provide a drive torque to the drive shaft.

In FIGS. 1D and 1E, further embodiments of operating the machine system are illustrated. Again, the control device operates the machine system according to a torque-speed relation, as in FIGS. 1A-C, for example according to the torque-speed characteristic HY as described before. In FIGS. 1D and 1E, the operation ranges OR1, OR2 are delimited by a threshold curve TC between a first threshold Tqg indicative of a first torque at a first speed and a second threshold indicative of a second torque at a second speed ωg, ng.

In the example of FIG. 1D, the threshold Tqg is set at a speed of zero (i.e. standstill), and the second threshold is set to be zero torque (i.e. no-load operation) at a speed ωg, ng. As shown in FIG. 1D, the threshold curve TC is at least in part elliptical. For example, a first PM machine and a second PM machine may be operated to provide each a respective drive torque to the drive shaft in operation range OR1. In operation range OR2, only the first PM machine is operated to provide a drive torque to the drive shaft.

In the example of FIG. 1E, the threshold Tqg is also set at a speed of zero (i.e. standstill), whereas the second threshold is set to be a torque which is not zero at a speed ωg, ng, which are designating maximum speed of the drive shaft in this example. The threshold curve TC of FIG. 1E is at least in part hyperbolic. For example, a first reluctance machine and a second reluctance machine may be operated to provide each a respective drive torque to the drive shaft in operation range OR1. In operation range OR2, only the first reluctance machine is operated to provide a drive torque to the drive shaft.

The invention claimed is:

1. A drive system (DS) for a land craft, comprising:
a machine system (M1, M2) for driving the land craft, the machine system comprising at least a first and a second electric machine (M1, M2) acting on a common drive shaft (S) for driving the land craft,
a control device (PE, PE1, PE2) which is adapted to control the machine system for operating in at least two operation ranges (OR1, OR2),
wherein in a first operation range (OR1) the first and second electric machines (M1, M2) are operated to provide each a drive torque to the drive shaft (S), and in a second operation range (OR2) only one of the electric machines (M1) is operated to provide a drive torque to the drive shaft (S),
wherein the control device (PE, PE1, PE2) is adapted for operating the machine system (M1, M2) according to a torque-speed relation, wherein the operation ranges (OR1, OR2) are delimited by a threshold curve (TC) between a first threshold (Tqg) indicative of a first torque at a first speed of zero, and a second threshold indicative of a second torque at a second speed (ωg, ng).

2. The drive system of claim 1, wherein the control device (PE, PE1, PE2) is adapted for operating the machine system (M1, M2) according to a torque-speed characteristic (HY) which is hyperbolic having substantially constant power over at least one operating range of the operating speed (ω).

3. The drive system of claim 1, wherein the first and second electric machines (M1, M2) are each a permanent-magnet machine.

4. The drive system of claim 3, wherein the first and second electric machines are coupled with each other through a freewheel clutch (FW).

5. The drive system of claim 1, wherein the machine system includes a permanent-magnet machine and a reluctance machine.

6. The drive system of claim 5, wherein the first electric machine (M1) is a permanent-magnet machine and the second electric machine (M2) is a reluctance machine.

7. The drive system of claim 1, wherein the machine system includes a permanent-magnet machine and an asynchronous machine.

8. The drive system of claim 7, wherein the first electric machine (M1) is a permanent-magnet machine and the second electric machine (M2) is an asynchronous (AC induction) machine.

9. The drive system of claim 1, wherein the machine system includes a reluctance machine and an asynchronous machine.

10. The drive system of claim 9, wherein the first electric machine (M1) is a reluctance machine and the second electric machine (M2) is an asynchronous machine.

11. The drive system of claim 1, wherein the first electric machine (M1) and the second electric machine (M2) are fixedly coupled with each other, or wherein the first electric machine (M1) and the second electric machine (M2) are coupled with each other through a transmission gear (G) so that the first and second machines rotate at different speed.

12. The drive system of claim 11, wherein the first electric machine (M1) and the second electric machine (M2) are fixedly coupled with each other in a manner that their rotor systems are twisted in angle.

13. The drive system of claim 1, comprising a first rotor (R1) of the first electric machine and a second rotor (R2) of the second electric machine which are coupled to the common shaft (S), and a common stator system (ST) which is common for the first and second electric machines (M1, M2).

14. The drive system of claim 1, wherein the first electric machine (M1) and the second electric machine (M2) are coupled with each other through a coupling (C) or through a free-wheel clutch (FW).

15. The drive system of claim 1, wherein the first electric machine (M1) comprises first stator metal sheets (MS1), and the second electric machine (M2) comprises second stator metal sheets (MS2) which are greater in thickness than the first stator metal sheets (MS1).

16. The drive system of claim 1, wherein the control device (PE, PE1, PE2) is coupled with an angular transmitter or rotor position sensor (AT) which is common for both electric machines (M1, M2).

17. The drive system of claim 1, wherein the machine system includes a permanent-magnet machine which comprises surface magnets, or is of magnetic flow concentrated construction, or has a Halbach arrangement of the magnets.

18. The drive system of claim 1, wherein the first and second electric machines (M1, M2) are housed in a common housing (H), or wherein the first and second electric machines (M1, M2) are housed in separate housings (H1, H2) which separate housings are coupled to a common cooling system (CS).

19. The drive system of claim 18, wherein the cooling system is indirectly water-cooling the stator systems (ST1, ST2) of the first and second electric machines.

20. The drive system of claim 1, wherein the first electric machine (M1) and the second electric machine (M2) are at least partially manufactured from same machine parts.

21. The drive system of claim 20, wherein the first electric machine (M1) and the second electric machine (M2) comprise same stator metal sheets (MS).

22. The drive system of claim 1, wherein the first electric machine (M1) and the second electric machine (M2) are at least partially manufactured from same axial segment parts (MS), wherein the first electric machine (M1) comprises a first number of axial segment parts (MS1) and the second electric machine (M2) comprises a second number of axial segment parts (MS2).

23. The drive system of claim 1, wherein the stator of at least one of the first electric machine (M1) and second electric machine (M2) is indirectly watercooled.

24. The drive system of claim 1, wherein a gear device is partially integrated inside the inner free space of one of the electric machines (M1 or M2).

25. The drive system of claim 1, wherein one of the machines (M1) is built in hollow shaft design and another of the machines (M2) is designed with smaller diameter than the one of the machines and is built in the one of the machines (M1).

26. The drive system of claim 1, wherein one of the machines is designed with an inner rotor and another of the machines with an outer rotor.

27. The drive system of claim 26, wherein the machine with the inner rotor is built in the machine with the outer rotor and both machines have at least one of a same stator carrier and a same stator cooling.

28. The drive system of claim 26, wherein the machine with the outer rotor is built in the machine with the inner rotor and both machines have a same rotor carrier.

29. The drive system of claim 28, wherein a rotor back iron is made of laminated sheets.

30. The drive system of claim 26, wherein the machine with the outer rotor is built in the machine with the inner rotor and both machines have a same rotor back iron.

31. The drive system of claim 1, wherein the control device (PE, PE1, PE2) is adapted for operating the machine system (M1, M2) according to a torque-speed relation, wherein the first operation range (OR1) covers speeds of the drive shaft greater than a first threshold ($\omega g$, ng), and torques at the drive shaft greater than a second threshold (Tqg).

32. The drive system of claim 1, wherein the threshold curve (TC) is at least in part elliptical, or hyperbolic, or straight.

* * * * *